United States Patent
Iwasaki

Patent Number: 5,771,411
Date of Patent: Jun. 23, 1998

[54] PHOTOMETRY DEVICE AND METHOD

[75] Inventor: Hiroyuki Iwasaki, Kanagawa-ken, Japan

[73] Assignee: Nikon Corporation, Tokyo, Japan

[21] Appl. No.: 767,298

[22] Filed: Dec. 16, 1996

Related U.S. Application Data

[63] Continuation of Ser. No. 419,550, Apr. 10, 1995, abandoned.

[30] Foreign Application Priority Data

Jun. 7, 1994 [JP] Japan .................................. 6-125378

[51] Int. Cl.[6] .............................. G03B 13/36; G03B 7/08
[52] U.S. Cl. ........................... 396/96; 396/111; 396/233; 250/559.04
[58] Field of Search .............................. 396/96, 233, 111, 396/234; 348/243; 250/559.04, 200, 201

[56] References Cited

U.S. PATENT DOCUMENTS

| | | |
|---|---|---|
| 5,068,737 | 11/1991 | Taniguchi et al. ..................... 354/400 |
| 5,151,732 | 9/1992 | Akashi et al. .......................... 354/402 |
| 5,220,375 | 6/1993 | Ishida et al. ........................... 354/430 |
| 5,267,015 | 11/1993 | Kai ........................................ 354/430 |
| 5,404,193 | 4/1995 | Harada ................................... 354/409 |
| 5,467,161 | 11/1995 | Odaka .................................... 354/410 |
| 5,485,239 | 1/1996 | Ohsawa .................................. 354/402 |
| 5,497,215 | 3/1996 | Iwasaki .................................. 354/432 |

*Primary Examiner*—Safet Metjahic
*Assistant Examiner*—Michael Dalakis
*Attorney, Agent, or Firm*—Oliff & Berridge, P.L.C.

[57] ABSTRACT

A photometry device includes a light-receiving element that photoelectrically converts light from the subject field and outputs an electrical signal corresponding to the intensity of the light. The light-receiving element is provided with at least one light-receiving pixel that is optically shielded from the light A photometry value input unit inputs the photometric output from the light-receiving element. An accumulation time setting unit sets the accumulation time of the light-receiving element on the basis of the output of the photometry value input unit, and computes the setting value of the accumulation time on the basis of the output of the light-receiving pixel.

21 Claims, 9 Drawing Sheets

PHOTOMETRY DEVICE AND METHOD

This is a Continuation of application Ser. No. 08/419,550 filed Apr. 10, 1995, now abandoned.

FIELD OF THE INVENTION

The present invention relates to a photometry device used in a camera or the like, or more specifically to a photometry device equipped with an accumulation-type light-receiving element such as a CCD or the like.

DESCRIPTION OF RELATED ART

Conventionally, photometry devices of this type have a structure wherein a photometry signal is obtained through the activation of a microprocessor by a clock signal generated by a clock generating device and a light-receiving element activated by a clock signal generated within the microprocessor. An accumulation time for the light receiving element is set based on the length of time during which the microprocessor sets an accumulation indicator signal terminal to low.

The relationship among the accumulation time t (in units of seconds), the output voltage V (in units of volts) from the light receiving element, the sensitivity S (in units of volts/Lux*seconds) and the luminosity L on the light-receiving surface (in units of Lux) is given by the following formula 1.

$$V = S*L*t \qquad (1)$$

In addition, the value of the accumulation time t is found from formula 2 below, using the target signal output voltage VAGC and the output voltage V' and the accumulation time t' of the previous photometry.

$$t = t'*VAGC/V' \qquad (2)$$

In this way, the next accumulation time t is computed on the basis of the previous accumulation time t' and output voltage V' so that the next output voltage coincides with the target signal output voltage VAGC.

With the described conventional photometry device, the target signal output voltage VAGC, shown in formula 2, is a constant value. This presents several problems.

The light-receiving element outputs a signal output voltage determined by pre-subtracting the output of a portion of the light-receiving element that is optically shielded (hereinafter referred to as the OPB output) from the signal output. However, when the OPB output increases, due to temperature rises, the effects of the smear phenomenon, etc., the dynamic range of the output voltage decreases. If the OPB output is great, the maximum output voltage will not meet the VAGC, even if the accumulation time of the light-receiving element is lengthened. The problem then arises that the accumulation time will become longer with each successive photometry, and eventually, the accumulation time will be lengthened to a maximum accumulation time that can be set. Consequently, an optimum accumulation time cannot be set.

SUMMARY OF THE INVENTION

It is an objective of the present invention to provide a photometry device wherein the optimum accumulation time can be set even when the OPB output is great.

In order to achieve the above and other objects of the invention, the photometry device according to embodiments of the present invention determines an optimum accumulation time on the basis of the OPB output. A photometry device in accordance with one aspect of the invention includes an accumulation type light-receiving element that photoelectrically converts light from the subject field and outputs an electrical signal corresponding to the intensity of the light. A photometry value input unit inputs the photometric output from the light-receiving element, and an accumulation time setting unit sets the accumulation time of the light-receiving element on the basis of the output of the photometry value input unit. The light-receiving element is provided with at least one light-receiving pixel that is optically shielded from light. The accumulation time setting unit computes the setting value of the accumulation time on the basis of the output of the light-receiving pixel. With this arrangement, it is possible to set the optimum accumulation time even when the dynamic range of the light-receiving element is shortened by the OPB output.

In accordance with another embodiment of the invention, a target value setting unit sets a target value for the output of the light-receiving element, and the accumulation time setting unit sets the accumulation time so that the output value from the light-receiving element coincides with the output target value. Consequently, it is possible to set the accumulation time that utilizes to the utmost the dynamic range of the light-receiving element.

In accordance with another embodiment of the invention, the target value setting unit can determine the output target value by subtracting the output from the optically shielded light-receiving pixel from a preset value. Consequently, it is possible to set the optimum target value even when the dynamic range changes.

In accordance with still another embodiment of the invention, the target value setting unit can also set the output target value as the maximum value of the output of the light-receiving element. Consequently, there is a high probability that all of the plurality of photometry outputs will fall within the dynamic range.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

A preferred embodiment of the present invention is described hereafter, with reference to the drawings.

Figure 1:
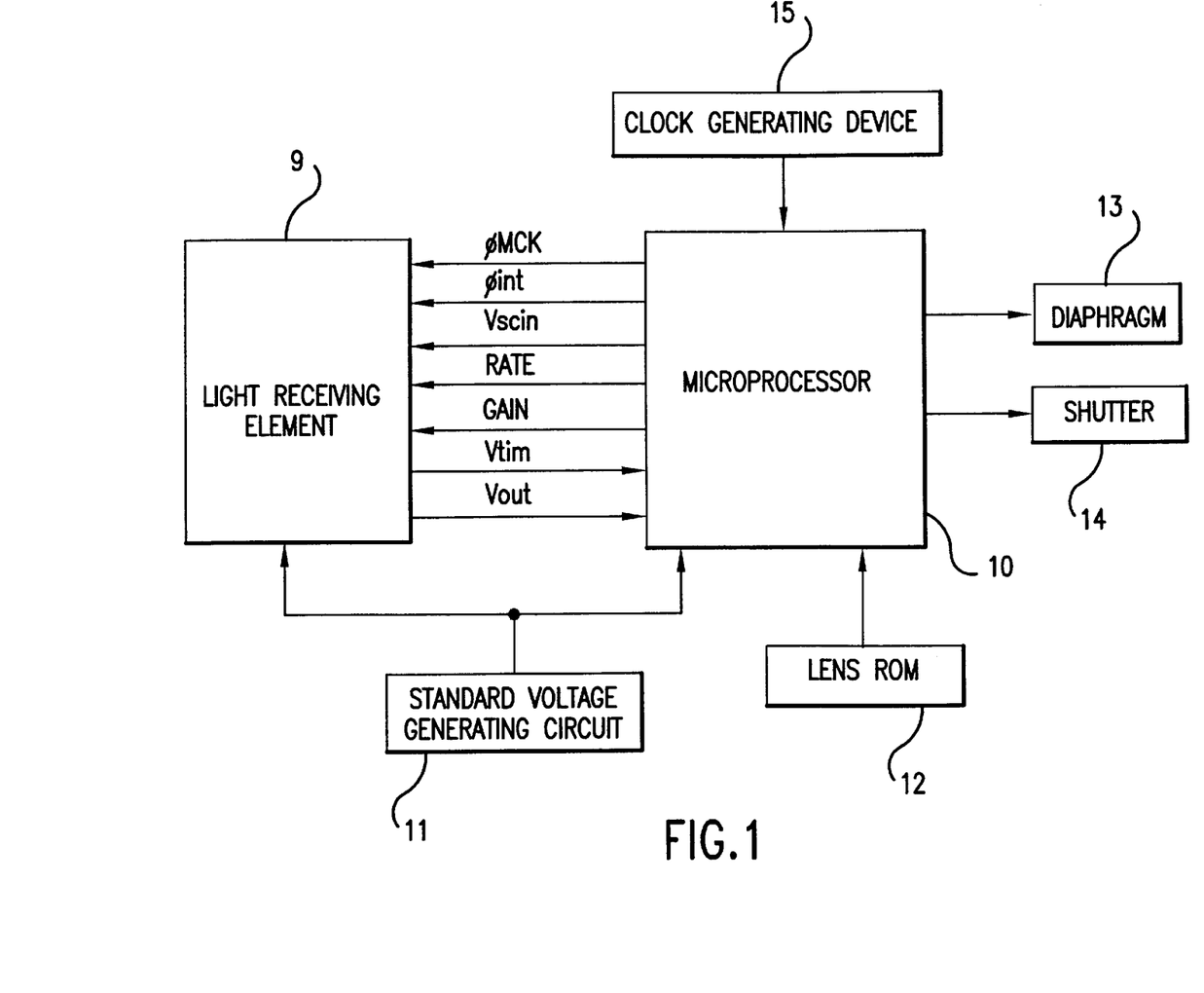
FIG. 1 is a block diagram showing the control structure of an embodiment of the photometry device according to the present invention.

FIG. 1 is a block diagram showing the basic control structure of a photometry device according to a first embodiment of the present invention.

The microprocessor 10 is a control circuit that controls exposure and the light-receiving element 9. A 20 MHz clock signal, which activates the processor 10, is generated by the clock generating device 15. The microprocessor 10 also controls various timers, A/D converters, serial communication interfaces, reading from and writing to the RAM and the operation of the input and output terminals. These components are built into the microprocessor and are controlled on the basis of a 10 MHz system clock.

Figure 3:
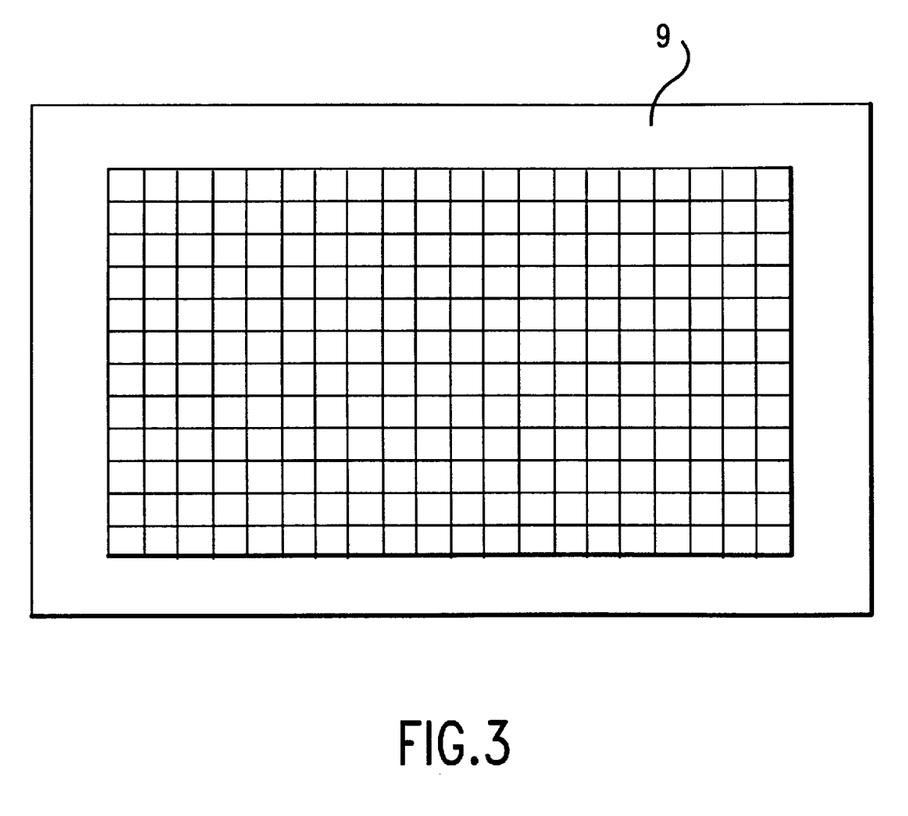
FIG. 3 is a diagram showing the division state of the photometry element in the photometry device according to the embodiment of FIG. 1.

The light-receiving element 9 is an accumulation-type element such as a CCD (charge-coupled device) sensor or the like. FIG. 3 illustrates the photometric division state of the light-receiving element 9 composed on the subject field. Photometry is conducted by dividing essentially the entire subject field into 240 regions in a grid 20 units horizontally and 12 units vertically.

A standard voltage is input into the microprocessor 10 and the light-receiving element 9 from a standard voltage generating circuit 11. The light-receiving element 9 transmits an output signal according to the electric potential difference from this standard voltage, and the microprocessor 10 converts the output signal from the light-receiving element 9 into a digital signal using an A/D converter, which has this standard voltage as its standard.

The signals output from the microprocessor 10 to the light-receiving element 9 include a master clock $\phi$MCK, which is the basis of operation of the light-receiving element 9; $\phi$int, which controls the commencement and termination of accumulation; a Vscin signal, which controls initial settings; a rate signal, which changes the ratio of division of the frequency of the master clock; and a gain signal, which changes the gain of the output circuit.

Signals output from the light-receiving element 9 to the microprocessor 10 include a timing signal Vtim, which incorporates the output signal, and an output signal Vout.

The microprocessor 10 conducts A/D conversion on the voltage of the output signal Vout in synch with the falling edge of the timing signal Vtim and stores the result as the photometry accumulation time t in the RAM. In addition, the microprocessor computes the correction value Z(i,j) on the basis of information such as the exit pupil distance PO, the focal length f and the aperture stop value F0 of the shooting lens. This information is obtained from the lens ROM 12. Furthermore, the microprocessor computes a brightness value for each division area within the subject field on the basis of the correction value t0 and the photometry accumulation time t.

The method of computing the brightness value is described below.

The microprocessor 10 computes the appropriate exposure value, using well-known methods, on the basis of the calculated brightness value. The microprocessor also controls the diaphragm 13 and the shutter 14 to conduct exposure of the film in accordance with the appropriate exposure value when a signal is detected that indicates the complete depression of a release button (not shown).

Figure 2:
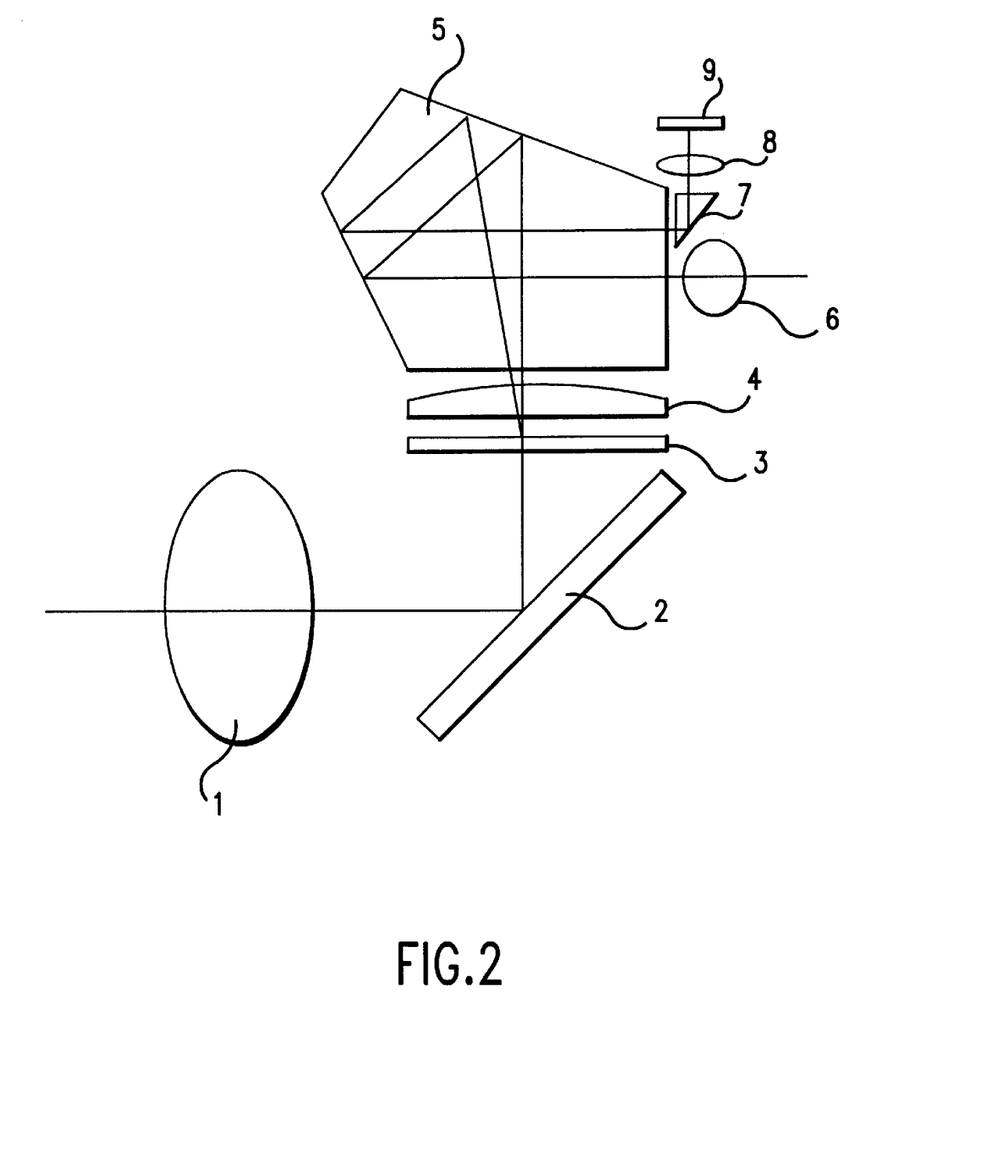
FIG. 2 is a diagram showing the optical system of the photometry device according to the embodiment of FIG. 1.

FIG. 2 is a diagram showing the optical system of an embodiment of the photometry device according to the present invention. Light rays that pass through the shooting lens 1 also pass through the quick return mirror 2, a diffusion screen 3, a condenser lens 4, a pentagonal prism 5 and an eyepiece lens 6 to reach the eye of the photographer. Part of the light that is diffused by the diffusion screen 3 passes through the condenser lens 4, the pentagonal prism 5, the photometry prism 7 and the photometry lens 8 to reach the light-receiving element 9.

Figure 4:
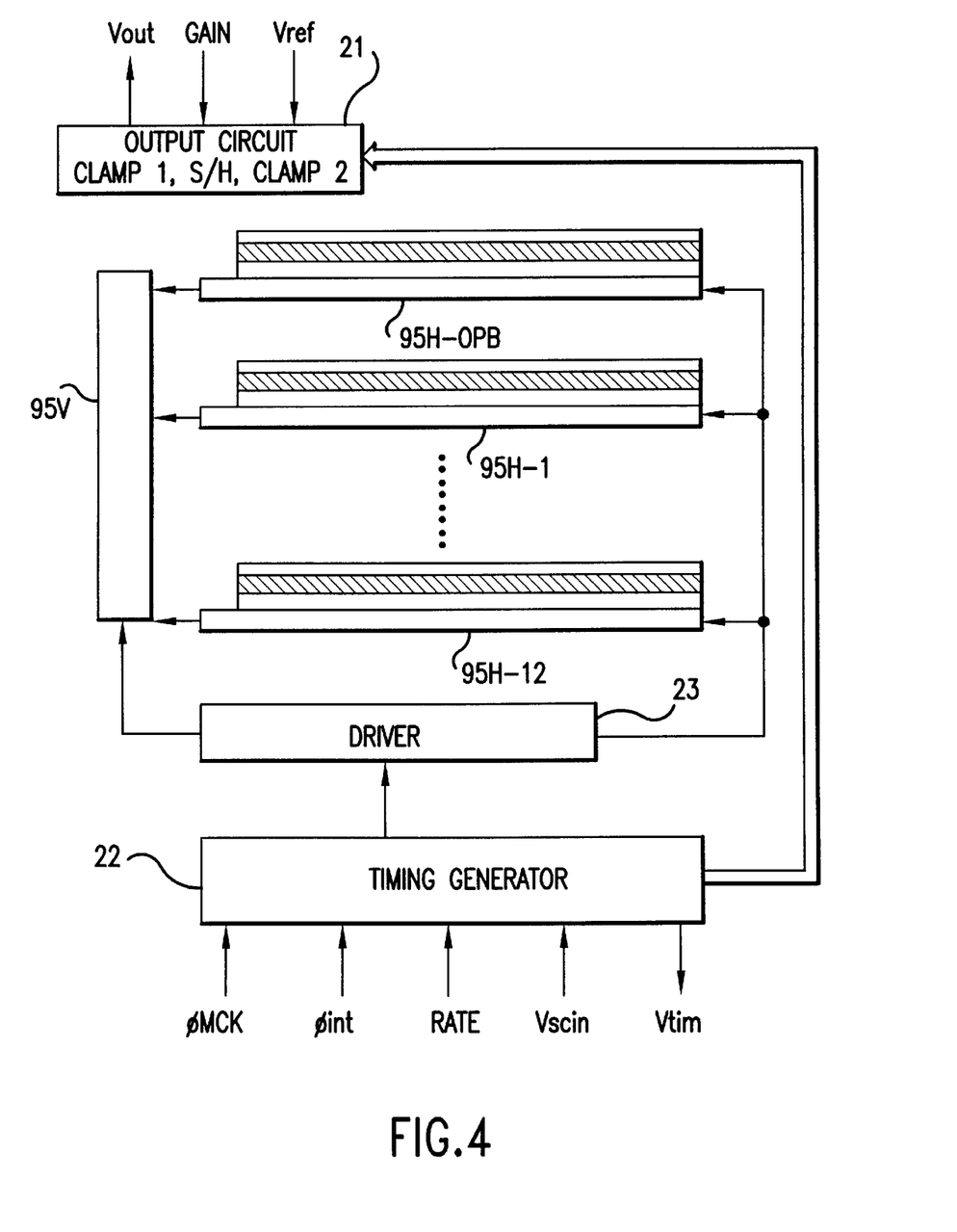
FIG. 4 is a diagram showing the internal structure of the light-receiving element of the photometry device according to the embodiment of FIG. 1.

In the light-receiving element 9, as shown in FIG. 4, the portions indicated by the shaded regions are sensor units. Light rays incident on these units are photoelectrically converted and generate an electric charge. The charge is conveyed to the output circuit 21 via the H registers 95H (95H-1 to 95H-12) and the V register 95V. The difference in electric potential, compared to the standard signal Vref, is output from Vout as the output signal.

In addition, the region indicated by the black area is a pixel (OPB), which is optically shielded from light, and is provided in order to output a dark current signal.

The gain signal from the microprocessor 10 is input to the output circuit 21. When the gain signal is high, the amplification of the output circuit is 1, and when this signal is low, the amplification switches to 4. The master clock $\phi$MCK, the accumulation indicator signal $\phi$int, the rate signal and the initialization signal Vscin are input into the timing generator 22.

With the timing generator 22, a clock signal is generated that forms the basis for driving each of the H registers 95H and the V register 95V. A drive signal for driving each of the registers 95H and 95V is created by the driver 23 on the basis of this clock signal. The timing generator 22 generates a clock signal frequency equal to the frequency of $\phi$MCK divided by 32, when the rate signal is high, and equal to $\phi$MCK divided by 16, when the rate signal is low. Hereinafter, the clock signal created by the timing generator 22 will be referred to as the base clock.

The initialization signal Vscin is normally high, but when this signal drops to low, the timing generator 22 outputs a signal with a frequency 8 times that of the base clock. Consequently, the residual electric charge in each of the registers 95H and 95V is rapidly expelled, and initializing of the registers 95 is accomplished. When the light-receiving element 9 is initialized upon connection to an electrical source, the signal falls to low for a set length of time (i.e., the length of time needed for three pixels worth of output of the light-receiving element 9 to be swept out with the 8 times faster clock).

When the initialization signal Vscin is low, the signal from the output circuit 21 becomes equal to the standard voltage Vref. The accumulation time of the light-receiving element 9 is accomplished during the interval when $\phi$int is low. In other words, normally $\phi$int=H, but this signal is dropped to low at the commencement of accumulation. Accumulation terminates when the signal again returns to high, at which point the electric charge is transmitted by each of the registers 95H.

The various pulse signals that control clamp 1, S/H and clamp 2, are output to the output circuit 21 from the timing generator 22. The relationship between these pulses and the output signal is described below.

Figure 5:
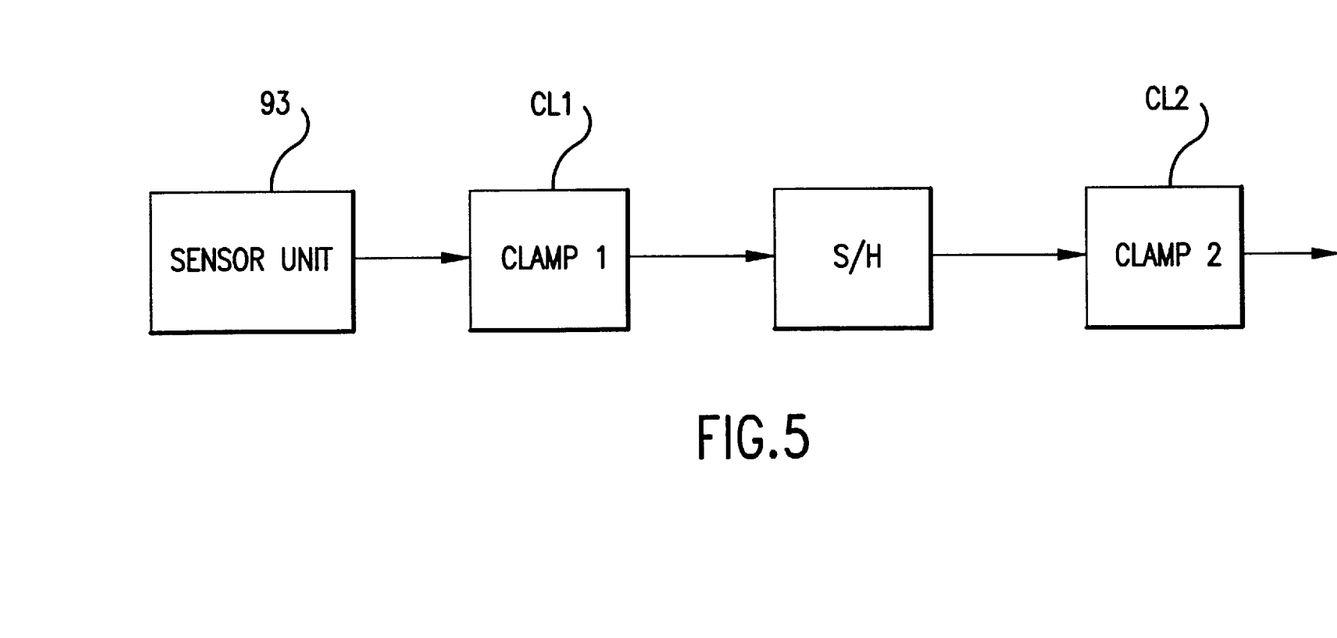
FIG. 5 is a block diagram showing the operation of the light-receiving element of the photometry device according to the present invention.

FIG. 5 illustrates the flow of the photometry output after passing through the sensor unit and being sent to the output circuit.

The photometry signal that has passed through the sensor unit 93 (corresponding to the shaded regions of FIG. 4) is converted to a signal indicating the difference from the standard voltage Vref by clamp 1 (CL1). Following this, a sample is held by the sample hold circuit (S/H). Then, the signal is again converted, by Clamp 2 (CL2), into another signal indicating the difference from the standard voltage Vref so as to negate the OPB output.

Figure 6:
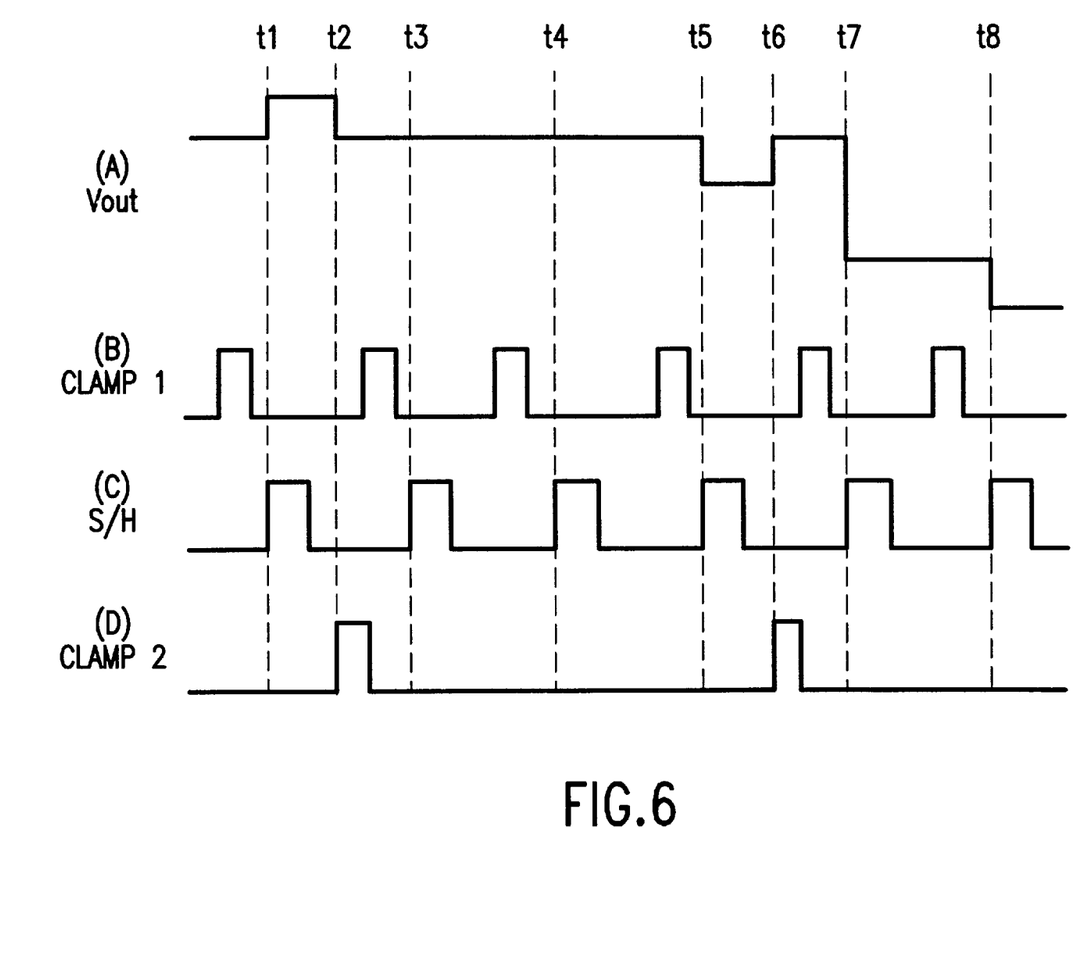
FIG. 6 is a timing chart showing the operation of the light-receiving element of the photometry device according to the present invention.

FIG. 6 is a timing chart showing the various signals including clamp 1, S/H and clamp 2, and the state of the output voltage.

There are three dummy pixels prior to the V register 95V. When one row of the V register 95V is read, first the three dummy pixels are read, following which the OPB output and then 12 photometric outputs are read. The dummy pixels are pixels that have no output signal (i.e., signal is 0).

A control pulse for clamp 1 rises each time a pixel is read (t1, t3, t4, t5, t7 and t8). The clamp 1 outputs, at each pulse, the difference between the standard voltage Vref and a respective pixel output. Following this, the signal of each pixel is sample held by the S/H pulse.

Clamp 2 is configured so that the pulse rises twice during one row of the V register 95V. The first time is immediately following the sample holding of the first dummy pixel (see t2). This is in order to restore the dummy pixel output to the original state, the output having risen by the amount of the OPB output as shown in the figure because the immediately prior output of the V register 95V was clamped by the amount of the OPB output.

The second time is immediately following the sample holding of the OPB output (see t6), in order to again subtract the OPB output from the photometry output.

Figure 7:
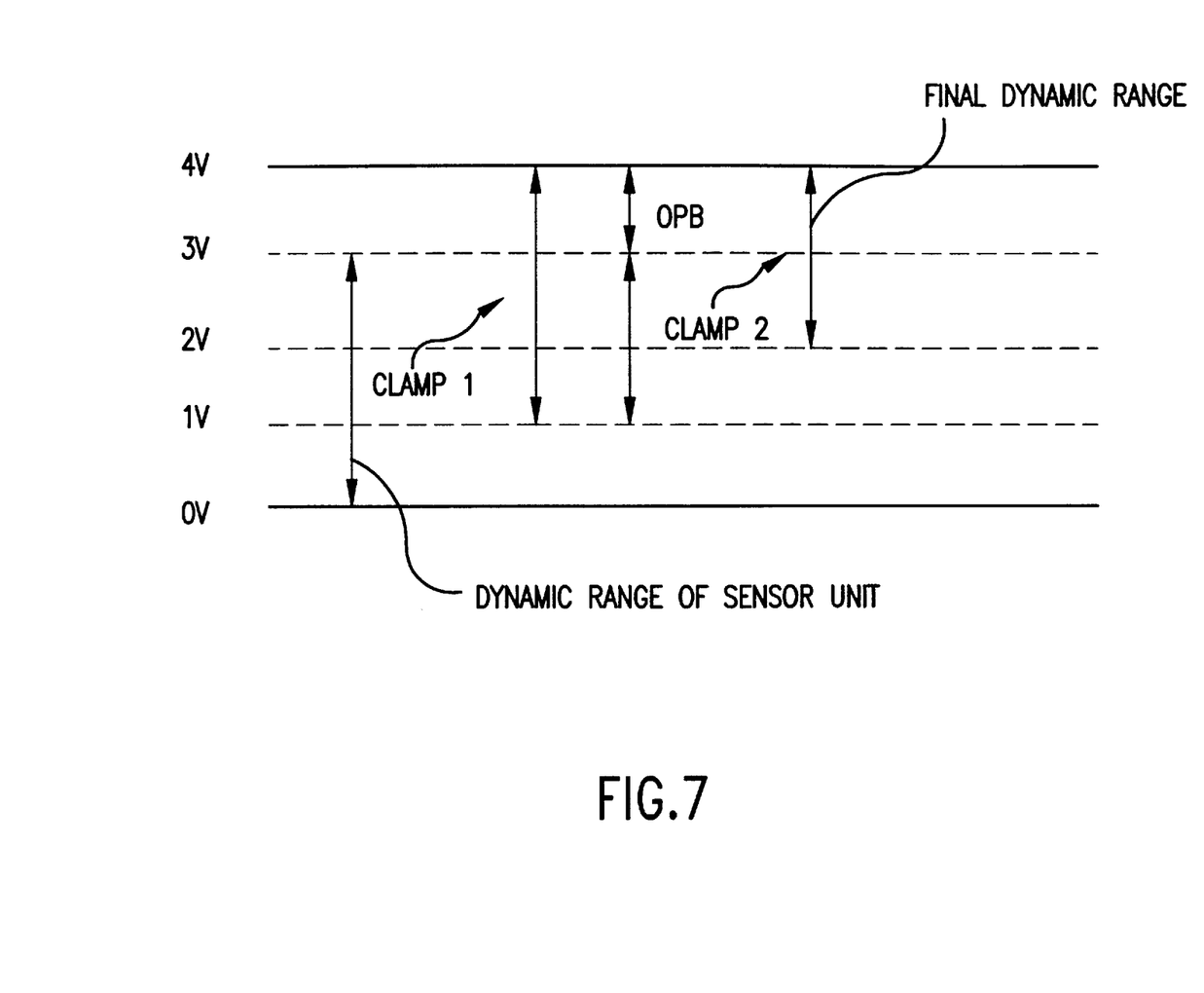
FIG. 7 is a graph showing the operation of the light-receiving element of the photometry device according to the present invention.

FIG. 7 shows the dynamic range of the photometry signal after passing through the sensor unit, after passing through clamp 1, and after passing through clamp 2.

After passing through the sensor unit 93, the range of the signal output is 0 V–3 V. Following this, the signal is clamped to the 4 V standard voltage Vref by clamp 1, and the output range becomes 1 V–4 V. At this time, caution is required because the voltage value becomes 4 V when the signal is 0, and the voltage value becomes 1 V at saturation. Furthermore, after the OPB output, the signal is clamped by clamp 2, and a value is output from which the OPB output is subtracted.

At this time, as shown in FIG. 7, when the OPB output is 1 V, the output range after clamp 2 is 2 V–4 V, becoming smaller by the amount of the OPB output. In other words, the dynamic range becomes 2 V. The reason for this is that even though the final output signal value is 2 V, when the OPB output is 1 V, prior to clamp 2, the signal output of the sensor unit has reached the saturation output level of 3 V, which is OPB plus the final output signal.

Figure 8:
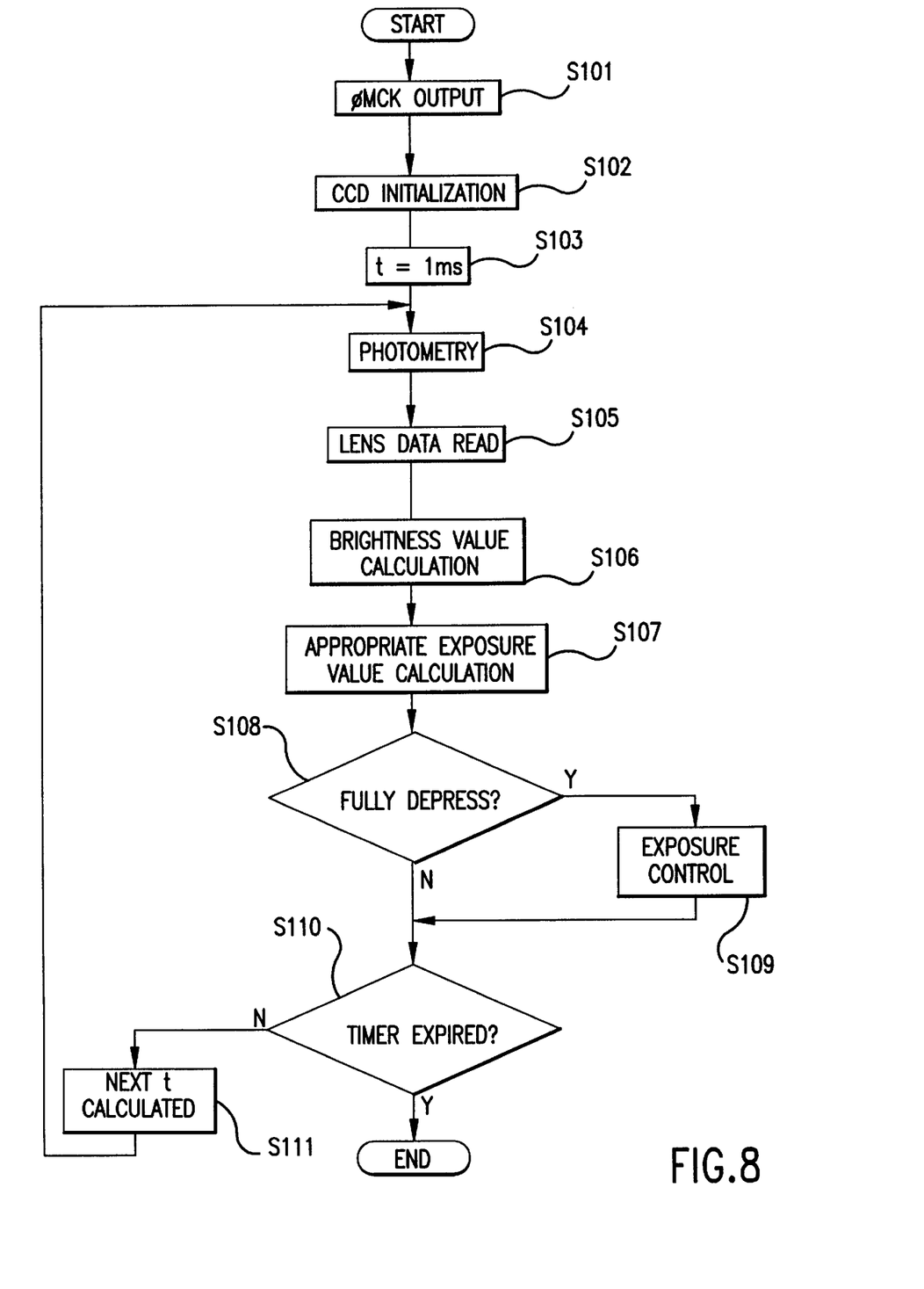
FIG. 8 is a flowchart showing the algorithm followed by the photometry device according to the present invention.

FIG. 8 is a flowchart illustrating the algorithm followed by the microprocessor 10.

The algorithm of the microprocessor 10 is started when the electrical source of the camera is connected by a shutter button (not shown) being depressed halfway.

In step S101, first φMCK is output. φMCK is 2.5 MHz, one-fourth the frequency of the system clock.

In step S102, initializing of the CCD is accomplished by Vscin falling to low for a preset length of time after the settings gain=H and rate=H are made.

In step S103, the first accumulation time t is set to 1 ms, and the accumulation time is stored at a predetermined address in the RAM in the microprocessor.

In step S104, photometry is accomplished with the light-receiving element 9 on the basis of the accumulation time t stored in RAM.

In step S105, the aperture stop value F0, the focal length f and the exit pupil distance value PO of the mounted shooting lens are read from the lens ROM 12, and the photometry correction value Z(i,j) (where i=1,2, . . . , 20; j=1,2, . . , 12) for each photometry region is calculated on the basis of these values. Here, Z(i,j) indicates the photometry correction data for horizontal address i and vertical address j.

Next, in step S106, the brightness value of the subject field is computed in each photometry region using formula 3 below.

$$BV(i,j)=(\log(\text{Vout}(i,j)/(t+t0))/\log 2)+Z(i,j)+F0 \qquad (3)$$

Here, the length of time corresponding to one period of the base clock is set as the accumulation time correction value t0. However, this may be adjusted through experimentation to a more optimum value.

For example, when φMCK=2.5 MHz and rate=H, t0=12.8 μs because the base clock is 78.125 kHz.

In addition, when φMCK=2.5 MHz and rate=L, t0=25.6 μs.

In the case wherein φMCK is changed by the microprocessor 10, t0 may be calculated using formula 4 below.

$$t0=32/\phi\text{MCK (rate}=H), 16/\phi\text{MCK (rate}=L). \qquad (4)$$

For example, when φMCK=1.25 MHz and rate=H, t0 becomes 25.6 μs.

When the brightness value computation is completed, the appropriate exposure value is calculated by conducting exposure computations using well-known means in step S107.

In step S108, the determination is made as to whether the release button is fully depressed. If this button is fully depressed, the microprocessor moves to step S109 and conducts exposure control on the basis of the appropriate exposure value.

In step S110, the determination is made as to whether the half-depressed timer has expired. If this timer has expired, the program ends. If not, the next optimum accumulation time is calculated and is stored in a predetermined address in the RAM in step S111. The microprocessor then returns to step S104 and repeats these same processes.

The method of setting the next optimum accumulation time t uses formula 5 below.

$$t=t'*(Vt-\text{Vopb}')/V\text{max}' \qquad (5)$$

Here, t' is the previous accumulation time, Vt is the target output signal value, Vopb' is the OPB output value during the previous photometry, and Vmax' is the maximum signal value, after application of clamp 2, during the previous photometry.

The OPB output coincides with the number of pixels in the H direction, as shown in FIG. 4. In this case, there are 20 OPB. Preferably, the average value of these is used as Vopb'. However, when there is insufficient time to find this average value, it is also possible to represent Vopb' using one arbitrary OPB output.

The value Vt is the maximum signal value Vmax of the light-receiving output in the case of formula 5. Using, for purposes of illustration, the embodiment described with respect to FIG. 7, Vt would be set to 3 V, which is the maximum output signal value at saturation of the sensor unit 93, or 2.4 V, which is this value multiplied by 0.8 in order to leave a margin. In this way, optimum photometry can be accomplished by using a target value VAGC corrected by VAGC=Vt−Vopb', even when the OPB output is large and the dynamic range is small.

However, when the value Vt is smaller than the saturation output value −Vopb', it would also be appropriate to not subtract Vopb' since Vt does not exceed the dynamic range.

In addition, formula 6 or formula 7 below can also be considered as variations of formula 5.

$$t = t'*(Vt-Vopb')/2/Vmean' \quad (6)$$

$$t = t'*(Vt-Vopb')/2\hat{}d/BVmean' \quad (7)$$

In formula 6, Vmean' is the simple average of the previous photometry values. In addition, VAGC=(Vt−Vopb')/2 indicates that the target has been set in the middle of the dynamic range.

In formula 7, d represents the intermediate value in the dynamic range when the photometric output is converted by an EV value. For example, when there are 8 levels, $\epsilon V=8$ and d=4. In addition, BVmean' is the logarithmic average of the previous photometry values and is found using formula 8 below.

$$BVmean' = 2\hat{}(1/n * \Sigma \text{ Log } V/\text{Log } 2). \quad (8)$$

Here, n represents the number of photometry pixels, and the symbol $\Sigma$ represents the sum from 1 to n. V is the output value of the photometry signal in each pixel.

In formula 7 and formula 8, symbol ^ indicates raising the value to a power. In formula 7, the corrected target value VAGC=(Vt−Vopb')/2^d indicates the logarithmic intermediate value in the dynamic range.

Figure 9A:
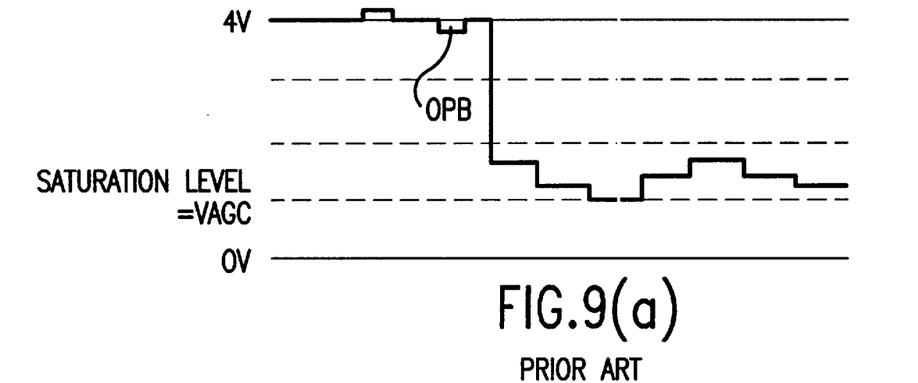
FIGS. 9a–9c are graphs illustrating the waveform output from the light-receiving element of the photometry device according to the present invention.
Figure 9B:
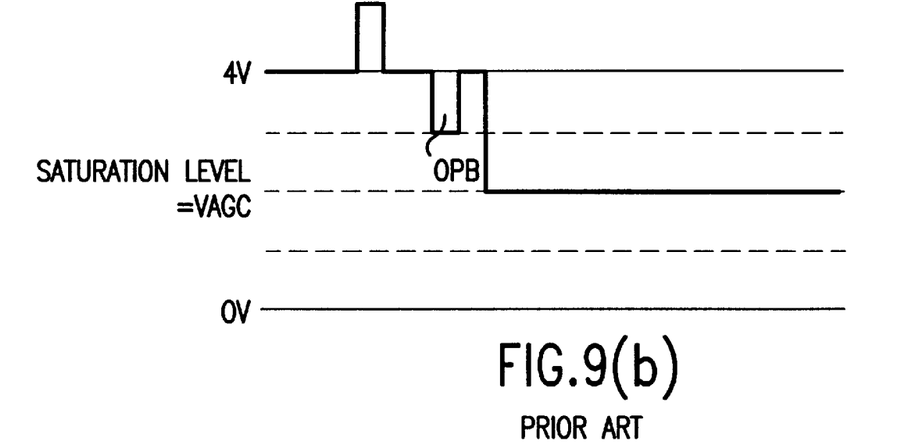

FIGS. 9a–9b illustrate the output waveforms of the light-receiving element when the present invention is not used. FIG. 9a illustrates the invention when the OPB output is small. In this case, no problems occur because the saturation level is essentially equal to the VAGC.

However, when the OPB output becomes greater, as shown in FIG. 9b, the dynamic range narrows by the amount of the OPB output and the saturation level moves above VAGC. When this occurs, the output never reaches VAGC no matter how long the accumulation time is extended. As a result, the output of all pixels reaches the saturation level.

Figure 9C:
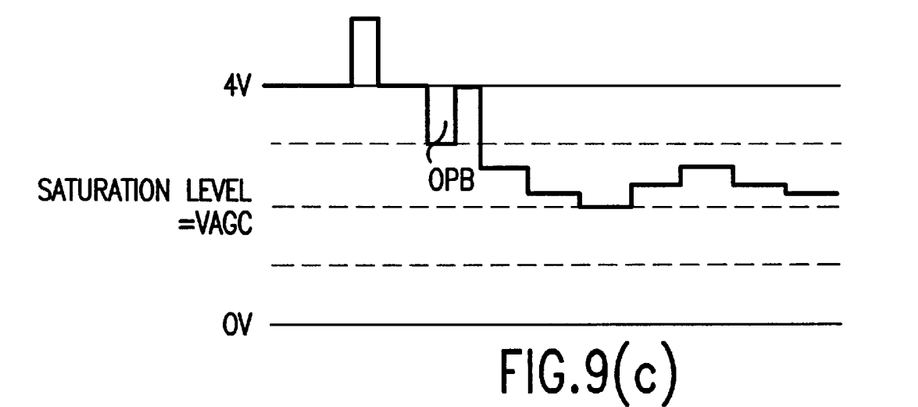

If the present invention is applied, as shown in FIG. 9c, the VAGC is corrected in accordance with the OPB output. Consequently, photometry optimally utilizing the dynamic range becomes possible.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A photometry device comprising:
    an accumulation type light-receiving element that photo-electrically converts light from a subject field and outputs an electrical signal corresponding to an intensity of the light;
    an accumulation time setting unit, communicating with said light-receiving element, that sets an accumulation time of the light-receiving element received from the electrical signal output, wherein the light-receiving element is provided with at least one light-receiving pixel that is optically shielded from the light, and wherein the accumulation time setting unit computes the accumulation time calculated from a preset saturation output from the at least one shielded light-receiving pixel, and
    a target value setting unit communicating with said light-receiving element that sets a target electrical signal value, wherein the accumulation time setting unit sets the accumulation time so that the electrical signal output from the light-receiving element coincides with the target electrical signal value.

2. A photometry device according to claim 1, wherein the target value setting unit sets the target electrical signal value by subtracting from the preset saturation output value the output from the at least one shielded light-receiving pixel.

3. The photometry device of claim 2, wherein the light receiving element comprises unshielded pixels, and wherein the preset saturation output value is a maximum value of output from the unshielded pixels.

4. The photometry device of claim 3, wherein the accumulation time setting unit sets the accumulation time on the basis of a maximum output signal of a previous photometry.

5. The photometry device of claim 3, wherein the accumulation setting time unit sets the accumulation time on the basis of an average of previous photometry values.

6. The photometry device of claim 3, wherein the accumulation time setting unit sets the accumulation time on the basis of a logarithmic average of previous photometry values.

7. The photometry device according to claim 1, wherein the light-receiving element is divided into a plurality of photometry regions, and the target value setting unit sets the target electrical signal value on the basis of a maximum value of the electrical signal output of the light-receiving element.

8. A method for setting an optimum accumulation time for a light-receiving element, comprising the steps of:
    providing a light receiving element with at least one optically shielded pixel,
    setting an accumulation time of the light receiving element computed from a preset saturation output value of the light receiving element and an output from the at least one optically shielded pixel, and
    setting a target output value wherein setting an accumulation time comprises setting the accumulation time such that the output of the light receiving element coincides with the target output value.

9. The method of claim 8, further comprising the step of correcting the target output value on the basis of the output of the at least one shielded pixel.

10. The method of claim 8, wherein the step of setting the target output value comprises subtracting the output from the at least one shielded pixel from the preset saturation output value of the light-receiving element.

11. The method of claim 10, further comprising the step of applying a correction factor to the preset saturation output value prior to subtracting the output from the at least one shielded pixel.

12. The method of claim 8, wherein the step of setting the accumulation time comprises setting the accumulation time based on a maximum output signal of a previous photometry.

13. The method of claim 8, wherein the step of setting the accumulation time comprises setting the accumulation time on the basis of an average of previous photometry values.

14. The method of claim 8, wherein the step of setting the accumulation time comprises setting the accumulation time on the basis of a logarithmic average of previous photometry values.

15. A photometry device comprising:

an accumulation type light-receiving means for photo-electrically converting light from a subject field and for outputting an electrical signal corresponding to an intensity of the light;

an accumulation time setting means for setting an accumulation time of the light-receiving means computed from the electrical signal output, wherein the light-receiving means includes at least one light-receiving pixel that is optically shielded from the light, and wherein the accumulation time setting means computes the accumulation time from a preset saturation value of the light-receiving means and an output from the at least one shielded light-receiving pixel; and a target value setting means for setting an output target value for the output of the light-receiving means, wherein the accumulation time setting means sets the accumulation time so that the output from the light-receiving means coincides with the output target value.

16. A photometry device according to claim 16, wherein the target value setting means sets the output target value by subtracting the output from the at least one shielded light-receiving pixel from the preset saturation value of the light-receiving means.

17. The photometry device of claim 16, wherein the light receiving means comprises unshielded pixels, and wherein the preset saturation value is a maximum output value of the unshielded pixels.

18. The photometry device of claim 21, wherein the accumulation setting means sets the accumulation time on the basis of the maximum output signal of a previous photometry.

19. The photometry device of claim 17, wherein the accumulation time setting means sets the accumulation time on the basis of an average of previous photometry values.

20. The photometry device of claim 17, wherein the accumulation time setting means sets the accumulation time on the basis of a logarithmic average of previous photometry values.

21. The photometry device according to claim 17, wherein the light-receiving means is divided into a plurality of photometry regions and when the target value setting means sets the output target value on the basis of a maximum value of the output of the light-receiving means.

\* \* \* \* \*